(12) United States Patent
Jenkins et al.

(10) Patent No.: US 9,886,285 B2
(45) Date of Patent: Feb. 6, 2018

(54) COMMUNICATION INTERFACE INITIALIZATION

(71) Applicant: Western Digital Technologies, Inc., Irvine, CA (US)

(72) Inventors: Dean Mitcham Jenkins, La Canada-Flintridge, CA (US); Dale C. Main, La Canada-Flintridge, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 106 days.

(21) Appl. No.: 14/675,531

(22) Filed: Mar. 31, 2015

(65) Prior Publication Data

US 2016/0291985 A1    Oct. 6, 2016

(51) Int. Cl.
*G06F 12/00*    (2006.01)
*G06F 9/44*     (2006.01)
*G06F 3/06*     (2006.01)

(52) U.S. Cl.
CPC ............ *G06F 9/4408* (2013.01); *G06F 3/065* (2013.01); *G06F 3/0619* (2013.01); *G06F 3/0625* (2013.01); *G06F 3/0679* (2013.01); *G06F 9/4403* (2013.01); *G06F 2206/1014* (2013.01)

(58) Field of Classification Search
CPC .... G06F 9/4408; G06F 3/0679; G06F 9/4403; G06F 3/0619; G06F 3/065; G06F 3/0625; G06F 2206/1014
See application file for complete search history.

(56) References Cited

U.S. PATENT DOCUMENTS

| | | | |
|---|---|---|---|
| 6,014,283 | A | 1/2000 | Codilian et al. |
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,101,065 | A | 8/2000 | Alfred et al. |
| 6,104,153 | A | 8/2000 | Codilian et al. |

(Continued)

FOREIGN PATENT DOCUMENTS

WO    01/61533 A2    8/2001

OTHER PUBLICATIONS

International Search Report and Written Opinion for PCT/US2016/024767 dated Jul. 1, 2016.
European Search Report for PCT/US2016/024767 dated Oct. 4, 2017.

*Primary Examiner* — David X Yi
*Assistant Examiner* — Alan Otto
(74) *Attorney, Agent, or Firm* — Chang & Hale LLP

(57) ABSTRACT

Systems and methods are disclosed for executing firmware in a computing device. A computing device comprises a controller comprising an interface and an interface state machine, non-volatile storage coupled to the interface state machine, the non-volatile storage storing initialization parameters, and a non-volatile memory module storing firmware for the device, the memory module coupled to the controller via the interface. The controller is configured to initialize the interface using the initialization parameters and the interface state machine, train the interface using the initialization parameters and the interface state machine, and execute the firmware from the non-volatile memory module.

25 Claims, 4 Drawing Sheets

(56) References Cited

U.S. PATENT DOCUMENTS

| | | |
|---|---|---|
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,823,435 B1 * | 11/2004 | Wisor .................. G06F 9/4403 711/103 |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |

(56) References Cited

U.S. PATENT DOCUMENTS

| | | |
|---|---|---|
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,205,070 B2 | 6/2012 | Toelkes |
| 8,213,106 B1 | 7/2012 | Guo et al. |
| 8,254,222 B1 | 8/2012 | Tang |
| 8,255,678 B2 | 8/2012 | Gehrmann |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |

(56) References Cited

U.S. PATENT DOCUMENTS

| | | | |
|---|---|---|---|
| 8,780,477 B1 | 7/2014 | Guo et al. | |
| 8,780,479 B1 | 7/2014 | Helmick et al. | |
| 8,780,489 B1 | 7/2014 | Gayaka et al. | |
| 8,792,202 B1 | 7/2014 | Wan et al. | |
| 8,797,664 B1 | 8/2014 | Guo et al. | |
| 8,804,267 B2 | 8/2014 | Huang et al. | |
| 8,824,081 B1 | 9/2014 | Guo et al. | |
| 8,824,262 B1 | 9/2014 | Liu et al. | |
| 2009/0254776 A1 | 10/2009 | Gonzalez et al. | |
| 2010/0035085 A1 | 2/2010 | Jung et al. | |
| 2012/0191964 A1 | 7/2012 | Lee et al. | |
| 2012/0284493 A1 | 11/2012 | Lou et al. | |
| 2013/0120870 A1 | 5/2013 | Zhou et al. | |
| 2013/0148240 A1 | 6/2013 | Ferris et al. | |
| 2014/0089573 A1* | 3/2014 | Sakthikumar | G06F 13/1689 711/105 |
| 2014/0279759 A1* | 9/2014 | Yang | G06F 3/0671 706/12 |
| 2014/0372670 A1* | 12/2014 | Vasilyuk | G06F 12/0246 711/103 |

* cited by examiner

COMMUNICATION INTERFACE INITIALIZATION

BACKGROUND

In computing devices and/or systems, firmware may be copied to a memory module for execution therefrom by one or more processors. Communication between processors and memory modules may require initialization of a communication interface configured to facilitate such communication.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
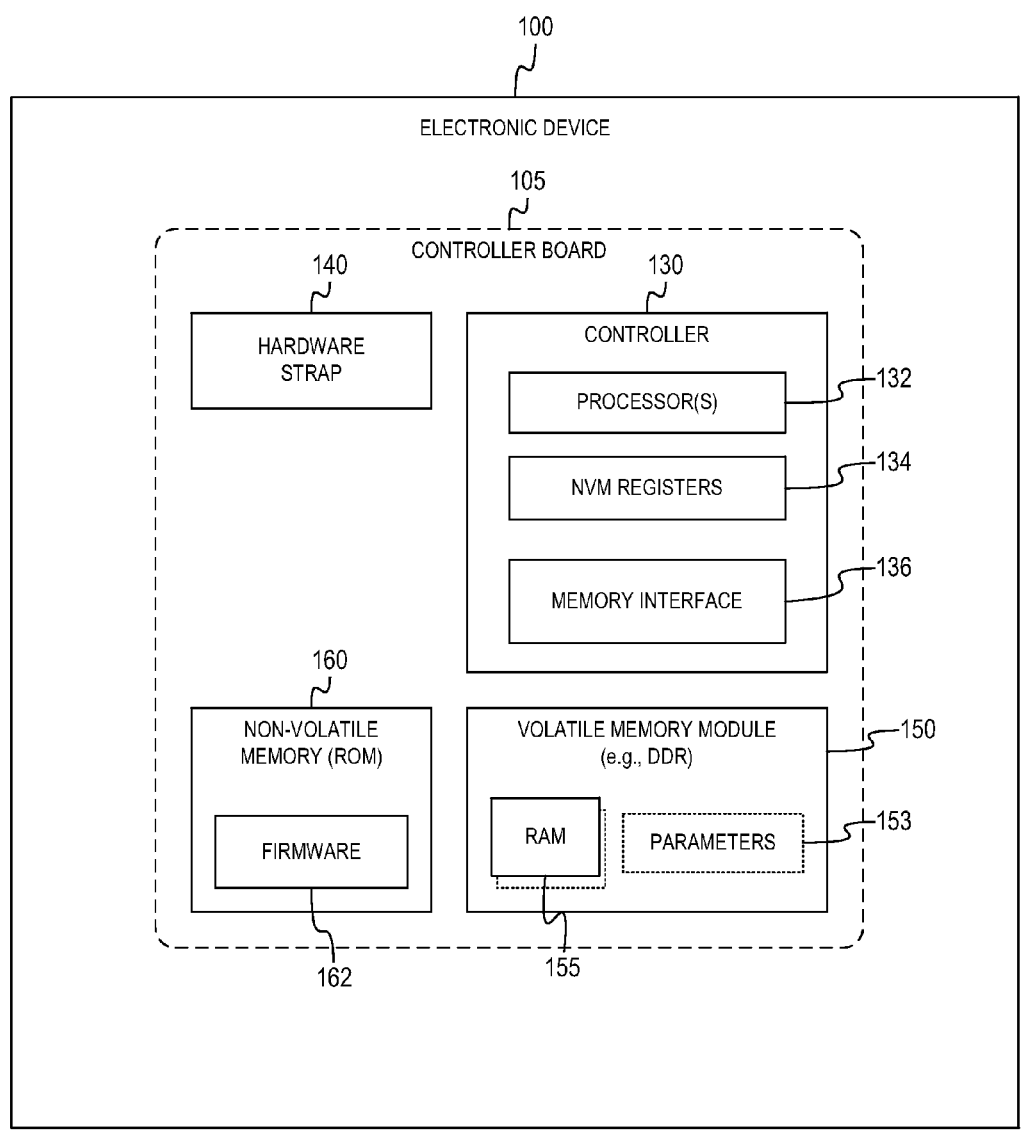
FIG. 1 is a block diagram of an electronic device according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to direct execution of firmware from an interface-connected non-volatile memory module.

Overview

In electronic devices, initial boot-up processes may cause one or more processors to execute boot loader code from, for example, an internal non-volatile memory (e.g., read only memory (ROM)). Boot-up processes may further involve transitioning to a vector directed at least in part by external bootstrap options and further reading from a specific boot device (e.g., serial peripheral interface (SPI) flash) to load additional boot loader code and/or device firmware. The external code provided by the boot device may include certain initialization parameters for "training" a communication interface (e.g., double data rate (DDR) interface) allowing the controller of the device to communicate with one or more additional peripheral/external memory modules (e.g., volatile DDR memory). Booting and initialization from a specific boot device (e.g., SPI flash) may therefore require a boot interface and boot flash chip in addition to memory to build a system, which can introduce cost and/or design issues.

With the advent of non-volatile memory (NVM) that utilizes DDR interfaces, it may be desirable in certain systems/devices to boot a processor directly from a device attached to a DDR interface or other interface for communicating with non-volatile memory external to the device controller (e.g., SoC). Generally, a DDR interface may need to be trained according to implementation-specific initialization parameters in order to allow for proper functioning. As disclosed in detail herein, adding non-volatile parameter storage in addition to a particularly-configured hardware training state machine to a device controller can allow the hardware to train the DDR interface without requiring initialization parameters and/or code to be fetched from a peripheral device. Once the DDR interface is trained, the processor(s) may be able to boot from the non-volatile memory module attached to the DDR interface, rather than requiring code to be fetched from an internal boot ROM or external serial flash device, for example.

According to certain embodiments, initialization parameters and/or boot code that would otherwise be stored in an external specific boot device may be maintained in non-volatile hardware devices of the device controller. The controller may further include a hardware state machine that is configured to read the parameters and perform interface training based thereon; the parameters may be used to seed the interface (e.g., DDR) to enable training of the interface.

Certain embodiments disclosed herein, by providing for booting directly from a non-volatile DDR module, may allow for elimination of one or more devices or components that may otherwise be required for booting and/or interface initialization, thereby potentially providing substantial cost savings, as well as reduced size/area requirements. Furthermore, embodiments disclosed herein may provide for initialization/training of communication interface(s) without requiring execution of any code by device/system processor (s). In certain embodiments, the first code that is executed by processor(s) in connection with booting of a computing device is from a DDR-attached module/device pre-loaded with the necessary code.

System Overview

FIG. 1 is a block diagram illustrating an electronic device 100 according to one or more embodiments disclosed herein. The electronic device 100 may be a computing device or any other electronic device. For example, in certain embodiments, the electronic device 100 may be a data storage device configured to provide data storage services to a host system (not shown).

The electronic device 100 includes a plurality of components, some of which are illustrated in the diagram of FIG. 1. In certain embodiments, one or more of the illustrated components may be mounted to, or otherwise associated with, one or more controller boards 105, which may be, for example, printed circuit boards (PCBs). In such a configuration, the controller board(s) 105 and the one or more components mounted thereto or associated therewith may be referred to herein as a printed circuit board assembly (PCBA).

The controller 130 may be a single chip or module, such as a system on a chip (SoC). In certain embodiments, the controller 130 includes one or more processors 132. For example, the one or more processors 132 may be microprocessors. In certain embodiments, the controller 130 may further comprise one or more hardware registers 134, which may be configured to store data.

The controller 130 may be configured to communicate with one or more other components of the controller board 105 and/or electronic device 100. To facilitate such communication, the controller 130 may comprise one or more communication interfaces. For example, the controller 130 may include a memory interface 136 for communicating with a memory module, such as the volatile memory module 150. In certain embodiments, volatile memory module 150 may be configured to communicate over a double data rate (DDR) interface.

The volatile memory module 150 may comprise one or more volatile memory chips 155, such as random access memory (RAM) chips. The volatile memory module 150 may further comprise a serial presence detect (SPD) chip configured to store one or more parameters 153 associated with the volatile memory module 150. For example, the parameters 153 may define one or more attributes of the memory chip(s) 155, such as timing, physical layout, chip number and/or configuration, trace length, tolerances, or the like. In certain embodiments, the volatile memory module 150 is not connected through a connector slot, but is hardwired to the controller board. Furthermore, in certain embodiments, the controller 130 is preprogrammed with the necessary parameters of the volatile memory module 150, such that no retrieval of parameters from the volatile memory module 150 is necessary.

In order for the controller 130 to communicate with the volatile memory module 150 over the interface 136, it may be necessary for the interface to be first initialized and/or trained. Therefore, in order to communicate with the volatile memory module 150, the controller 130 may access or otherwise acquire initialization parameters associated with the interface 136 and perform initialization/training using such parameters.

In certain embodiments, the controller 130 may acquire the initialization parameters for initializing the interface 136 from one or more non-volatile memory modules, such as the non-volatile memory 160, which may be, for example, a serial peripheral interface (SPI) flash memory module, wherein the memory 160 stores boot code for booting the electronic device and/or firmware for execution by the controller in operating the electronic device 100. The controller 130 may be further configured to communicate with hardware strap circuitry 140, which may provide certain system configuration data. The hardware strap circuitry 140 may comprise one or more pins that may be strapped up or down via a hardware resistor or the like, wherein the controller 130 is configured to read the pins and configure functionality based thereon. The hardware strap data may be read prior to execution of firmware controlled mechanisms.

With respect to the electronic device 100, there may be various methods for code booting the processor(s) 132 selected by bootstrap options. For example, booting may be implemented from a parallel bus NOR flash device with a chip select, from a serial flash device via an SPI interface, or from an external device. With the advent of non-volatile memories incorporating DDR interfaces for speed, the opportunity arises to also boot from such external non-volatile DDR devices. However, in order to boot from an external DDR memory, it may be necessary for the controller 130 to first initialize the peripheral interface associated with the memory.

Certain embodiments disclosed herein provide for the inclusion of a set of programmable non-volatile registers, or other internal hardware non-volatile memory, for storing the DDR training parameters, as well as a state machine (not shown) that may be used to perform the training. Such a configuration may obviate the need to fetch any code from external memory in order to initialize the interface. Therefore, the processor(s) 132 may be able to boot from a non-volatile memory module attached to the DDR interface. Furthermore, maintaining the initialization parameters within a separate non-volatile register array may allow for custom programming for a specific design or layout. Thus, with these parameters separate from the controller's internal boot loader memory chip, the device may be programmable to various different DDR layouts. It should be understood that the initialization parameters for initialization of the memory interface 136, as described herein, may be separate from the SPD parameters 153 shown.

As described, the use of a non-volatile DDR memory for booting may eliminate the need for a separate boot interface and boot device. Furthermore, the non-volatile DDR memory may also replace the need for a separate volatile DDR memory for use as main memory (e.g., DRAM), thereby providing a system having minimal circuitry/components.

Figure 2:
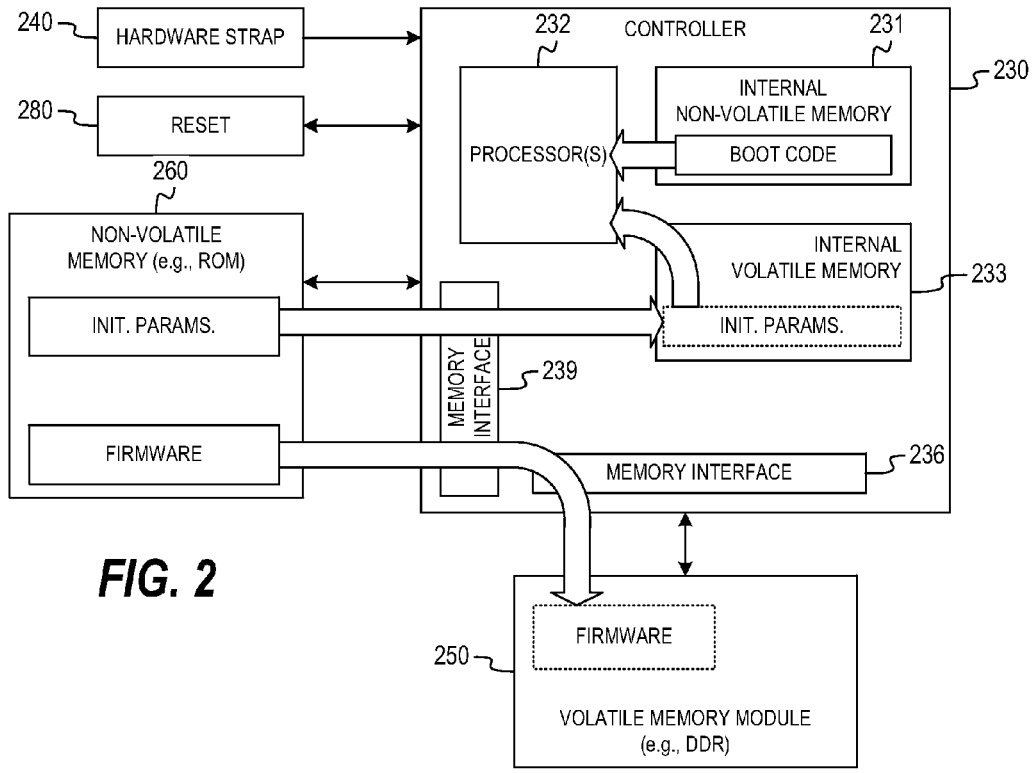
FIG. 2 is a block diagram of a computing or electronic device according to an embodiment.

FIG. 2 is a more detailed block diagram of a computing or electronic device, and may correspond in certain respects to the electronic device 100 shown in FIG. 1 and described above. The device of FIG. 2 includes a controller 230 which comprises one or more processors 232, such as microprocessors or the like. The controller 230 may further include one or more internal non-volatile memory modules 231 and/or internal volatile memory modules 233. For example, the internal non-volatile memory 231 may comprise a read only memory (ROM) configured to store certain boot code or other code that is desirable to be maintained by the controller in a persistent manner.

The controller may be configured to fetch boot code from the internal non-volatile memory 231, as well as additional boot code from the non-volatile memory 260. By retrieving code from the internal memory 231 and/or the external memory 260, the controller 130 may be able to implement hardware initialization under firmware control. For example, the controller 130 may implement initialization and/or training of the memory interface 236 under firmware control.

The internal volatile memory 231 may be, for example, SRAM, or other type of volatile memory. In certain embodiments, the internal volatile memory 233 may be utilized by the controller 230 for the purpose of caching code and/or data utilized by the one or more processors 232.

The memory interface 236 may comprise a physical communication interface for communicating with one or more memory modules external to the controller 230, such as the volatile memory module 250. The volatile memory module 250 may be, for example, DDR DRAM, and may be used as main memory by the controller 230. The volatile memory module 250 may comprise one or more volatile memory chips.

The controller 230 may be configured to communicate with hardware strap circuitry 240, and obtain therefrom certain configuration data for initializing/configuring the controller 230 and/or one or more components thereof. The hardware strap circuitry 240 may comprise straps/pins that are sensed by the controller 230 and latched into data storage registers of the controller. The device hardware may use the information in the registers to configure itself, such as by enabling/disabling communication ports, or the like.

The device of FIG. 2 may further comprise one or more reset lines 280, which may be communicatively coupled to the one or more processors 232, and allow the system to hold one or more of the processor(s) 232 in reset. In certain embodiments, the processor(s) 232 are held in reset until the reset line 280 is released.

The non-volatile memory 260 may be coupled to the controller 230 over an interface 239, such as a serial peripheral interface bus (SPI) interface. In certain embodiments, the non-volatile memory is a NOR boot flash, and may be an 8-pin chip, for example, having both power and data pins.

On startup, as mentioned above, the controller 230 may first reference data provided by the hardware strap circuitry 240. The controller 230 may then load and execute boot code stored in the internal non-volatile memory 231. In order to execute the code, the processor(s) may be released from reset and enter an active state. The controller 230 may then load and execute boot code stored in the internal non-volatile memory 231. Once the boot code has caused the hardware to be initialized in a known state, the controller 230 may be able to communicate with the memory interface 236. For example, the processor(s) 232 may be utilized to initialize the memory interface 239 for communicating with the non-volatile memory 260. The boot code from the internal non-volatile memory 231 may be used to configure the interface 239 (e.g., SPI) for communicating with the non-volatile memory 260. The boot code stored in the internal non-volatile memory 231 may be considered first stage boot loader code.

According to the boot code loaded from the internal non-volatile memory 231, the controller may be directed to load certain information from the non-volatile memory 260, such as second stage boot loader code and/or initialization parameters for initializing a memory interface 236 of the controller 230. As an alternative, in certain embodiments, all of the boot loader code may be maintained in the internal non-volatile memory 231, as well as the firmware image, such that the non-volatile memory 260 may not be necessary for such purpose.

The initialization parameters stored in the non-volatile memory 260 may be copied to the internal volatile memory (e.g., SRAM) 233 by the controller 230 and executed therefrom. The initialization parameters may provide information for initializing and/or training the memory interface 236 by the processor(s) 232.

Once memory interface 236 has been initialized and/or trained, the controller 230 may be configured to load firmware from the non-volatile memory 260, such as a firmware image, to the volatile memory module 250, wherein the volatile memory module 250 provides main memory, or system memory, for the device or system. That is, the controller 230 may be configured to execute the firmware stored in volatile memory module 250 in operating the system and/or device.

Direct Execution of Firmware from External Non-Volatile Memory

The various components of the system of FIG. 2 may individually and/or collectively introduce cost and/or space/design complexity. Therefore, it may be desirable to eliminate one or more components from the system to advantageously save cost and/or space. Certain embodiments disclosed herein provide a computing or electronic device including a single memory device for both booting and execution. Such a solution may allow for the elimination of a specific boot interface, which may save pin count and/or reduce the package size of the controller 230 or other component(s). In addition, solutions disclosed herein may allow for reduced hardware and/or software system complexity. Furthermore, certain embodiments maintain the programmable interface initialization parameters separate from the boot loader code, which may allow the device to be tailored to the environment for which it is intended.

Figure 3:
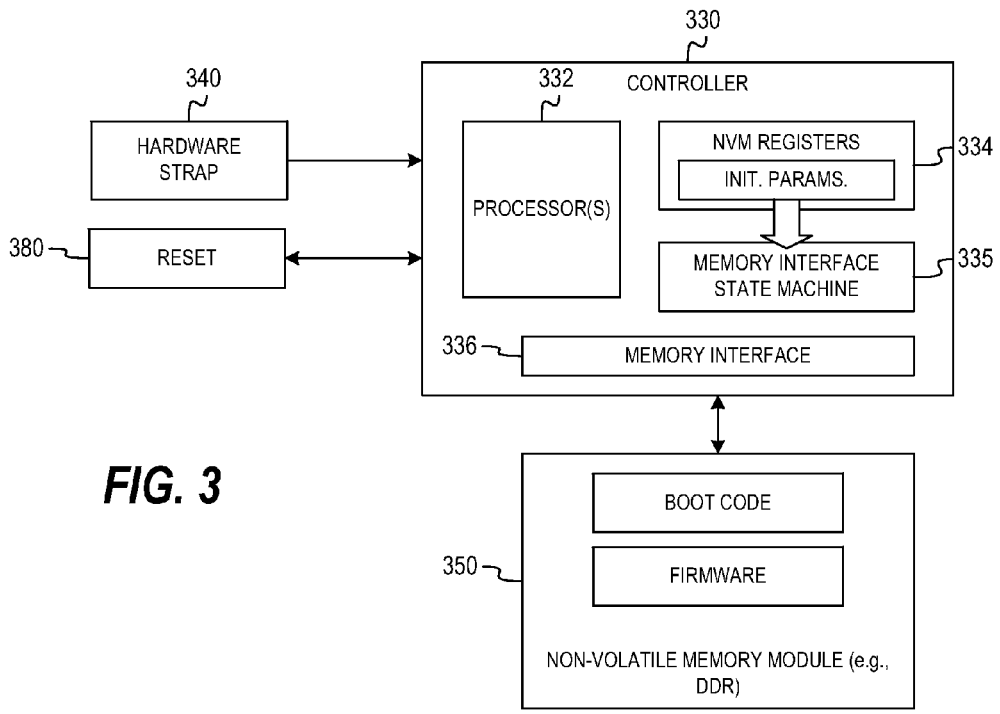
FIG. 3 is a block diagram of a computing or electronic device according to an embodiment.

FIG. 3 illustrates a block diagram of a device providing for direct loading and/or execution of firmware and/or boot code from a non-volatile memory module 350 coupled to a controller 330 over a memory interface 336 that requires initialization and/or training for communication therewith. The device includes a controller 330 having one or more processors 332 and a memory interface 336 for communicating with a non-volatile memory module 350. Unlike the device of FIG. 2, in which the controller 230 is coupled to an external volatile memory module 250 over the memory interface 236, the memory module 350 of FIG. 3 is a non-volatile memory. However, similarly to embodiments described above, the non-volatile memory module 350 may comprise DDR memory, and therefore may provide relatively high speed access to data stored therein. The non-volatile memory module 350 stores the data in a persistent, rather than a volatile, manner, which may provide certain benefits as described herein.

The non-volatile memory module 350 may further serve as main memory for the device, which may advantageously result in the device benefitting from non-volatile system memory. In certain embodiments, the non-volatile memory module 350 is a direct-attached module mounted (e.g., soldered) to a PCB to which the controller 330 is likewise mounted.

In certain embodiments, the controller 330 is configured to boot from the non-volatile memory module 350, which is pre-loaded with boot code and firmware for execution by the controller 330; that is, after a power cycle, the first instructions executed by the processor(s) 332 may be from the non-volatile memory 350 (e.g., DDR-attached device). The processor(s) 332 may effectively be idle until the memory interface 336 is trained according to one or more methods disclosed herein. Once the memory interface 336 is trained, it may be possible for the controller 330 to fetch the first instructions from the non-volatile memory device coupled to the controller 330 over the interface 336.

In order to be able to train the memory interface 336 without utilizing the processor(s), it may be necessary for the system to include additional hardware configured to execute said training. The device of FIG. 3 may include hardware strap circuitry 340 and/or reset circuitry 380, as described above in relation to FIG. 2. Furthermore, the controller 330 of FIG. 3, may include (1) one or more non-volatile hardware registers 334, which may be configured to store initialization parameter data associated with the memory interface 336, as well as (2) hardware state machine logic 335 configured to read the registers 334 and initialize/train the memory interface 336 using the data stored therein. For example, the NVM registers 334 may be programmed with initialization parameters used to initialize/train the memory interface 336, wherein the initialization parameters are loaded into the interface state machine 335.

The NVM registers 334 may comprise one or more fuses, which may be used in certain embodiments for the dual purpose of storing the aforementioned initialization parameters data and security signatures for encryption, or other data. The registers 334 (e.g., fuses) may advantageously be burned during a manufacturing process. In certain embodiments, the registers 334 are one-time programmable devices. The registers 334 may therefore have the initialization parameter data and/or other data (e.g., security data) hard-coded therein. The NVM registers 334 may further include redundancy copies of at least some of the data stored therein. The controller 330 may be configured to read the initialization parameters from the NVM registers 334 while the processor(s) are held in reset. Although the registers 334 are described herein as comprising hardware registers, it should be understood that other types of non-volatile storage may be used within the scope of embodiments disclosed herein.

Because the device hardware substantially autonomously implements the initialization/training of the memory interface 336, it may be unnecessary for the boot code stored in the non-volatile memory module 350 to include memory interface initialization/training code for such purpose. On start-up, the hardware strap circuitry 340 may direct the controller 330 to read the initialization parameters from NVM registers 334 into the state machine 335 and use the parameters to perform the training operations. The hardware strap data and/or data stored in the NVM registers 334 may further direct the controller to release the processor(s) 332 from reset and jump to the boot code and/or firmware in the non-volatile memory module 350 over the newly-operable memory interface post training (e.g., DDR). As shown, the system of FIG. 3 may leave absent a separate boot flash external to the controller 330, including one or more associated pins. Since booting is performed only from the internal hardware and the attached non-volatile memory 350, the boot up process may require fewer stages than other systems, thereby potentially speeding up boot time.

The state machine circuitry 335 is designed and/or configured to initialize and/or train the memory interface using the initialization parameter data, which may be provided thereto from the one or more NVM registers 334. Therefore, rather than using coded algorithm(s), the controller 330 utilizes a hardware state machine to implement interface initialization/training logic.

Firmware Execution Processes

Figure 4:
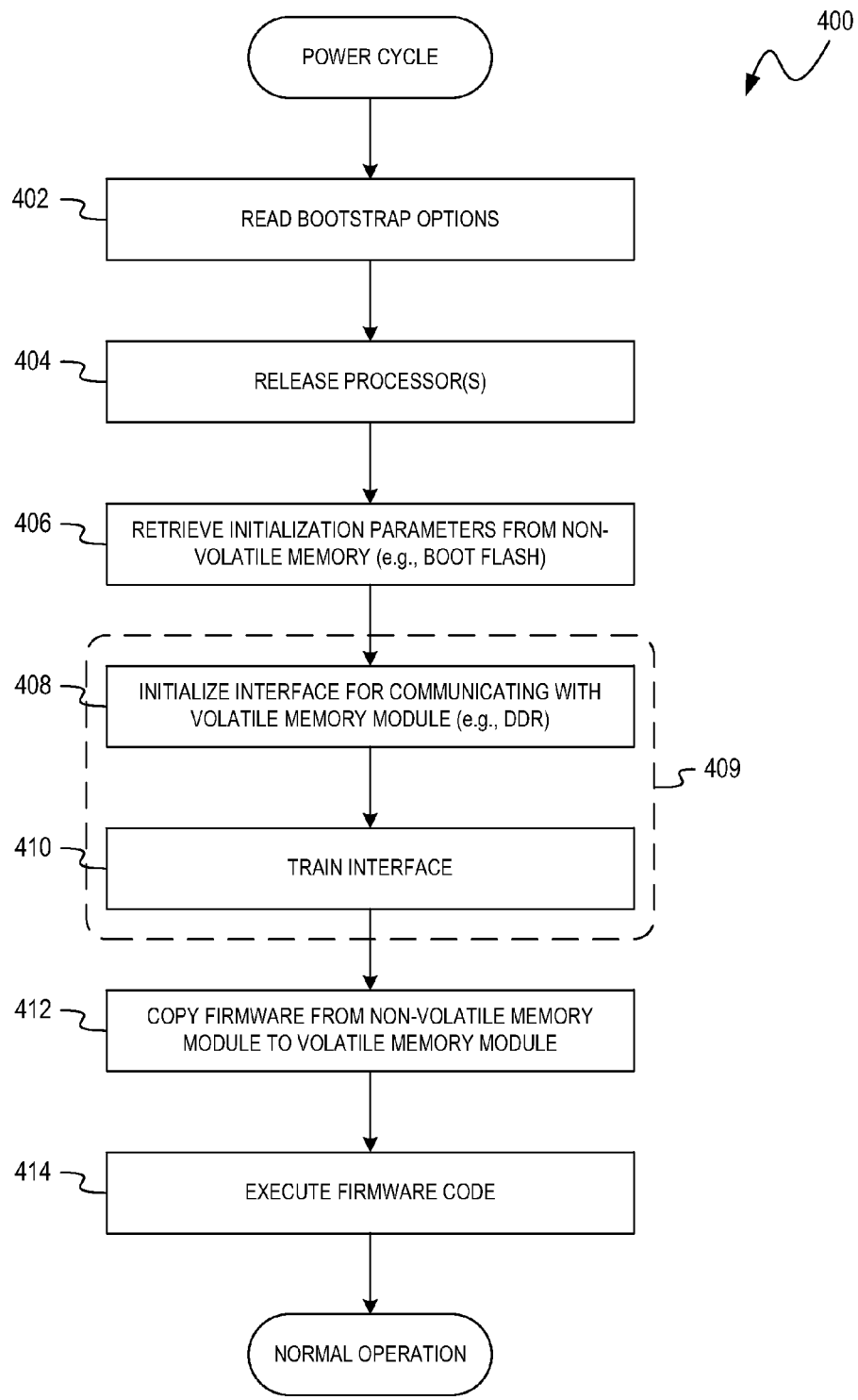
FIG. 4 is a flow diagram illustrating a process for executing firmware in a computing or electronic device according to an embodiment.

FIG. 4 illustrates a process 400 for executing firmware in a computing or electronic device according to one or more embodiments. As shown, the process 400 may be executed after a power cycle. In one embodiment the process 400 involves first reading bootstrap options at block 402. For example, a state machine in hardware of a computing device may read bootstrap options prior to the relevant processor(s) being released from reset. The bootstrap data may direct the controller as to which chip selects are to be activated.

At block 404, the process 400 involves releasing one or more processors in order to execute initialization/boot code using the processor(s). The one or more processors (e.g., microprocessors) may be components of a controller (e.g., SoC). The processor(s) may be released at least in part by releasing one or more reset lines coupled to the controller/processor(s). In certain embodiments, the process 400 further involves initializing an interface associated with an external boot device (e.g., SPI interface).

At block 406, the process 400 involves retrieving initialization parameters from non-volatile memory, such as a boot flash module coupled to a controller over a communication interface. The processor(s) may determine where to fetch the initialization parameters and/or boot code based on the bootstraps read at block 402. In certain embodiments, the initialization parameters, as well as possibly second stage boot code, are retrieved from an external boot device, such as a SPI flash chip. The second stage boot loader image may include the initialization parameters as well as the firmware image for the device.

The process 400 further involves communicating with a volatile memory module coupled to the controller over a memory interface (e.g., DDR). However, in order to communicate with the volatile memory module, it may first be necessary to initialize and/or train the associated memory interface. At block 408, the one or more released processors may be used to initialize the interface using the previously-retrieved initialization parameters. The interface may further be trained at block 410. Whereas the initialization process may be based on pre-defined configuration starting point data, subsequent training may provide further fine tuning for configuration of the interface. The initialization/training blocks (collectively 409) may be performed at least in part by the processor(s), which were previously released from reset. For example, such processes may be directed by code stored in internal volatile SRAM memory of the controller.

Once the interface has been initialized and trained, the process 400 may involve copying firmware from the external non-volatile memory to the volatile memory module at block 412. For example, the firmware may be copied from a NOR flash chip to a DDR memory coupled to the controller through the initialized interface.

At block 414, the copied firmware may then be executed from the volatile memory module, after which the system or device may be configured to operate under normal operation. For example, the processor(s) may jump to the copied firmware in attached DDR memory and execute the code, after which the device may be substantially operational.

Figure 5:
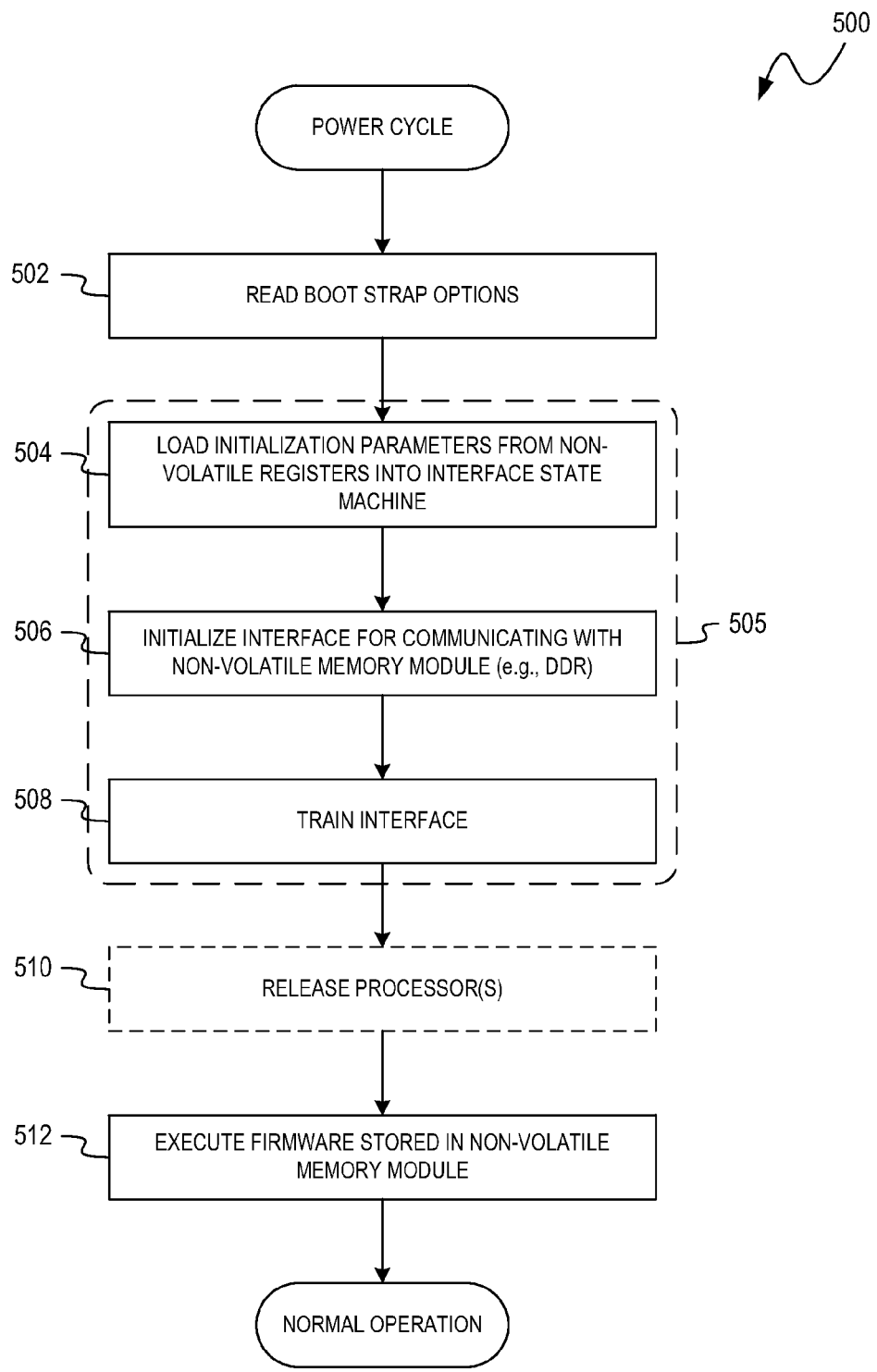
FIG. 5 is a flow diagram illustrating a process for executing firmware in a computing or electronic device according to an embodiment.

FIG. 5 provides an illustration of a process 500 for executing firmware in a computing or electronic device according to one or more embodiments, wherein firmware may be executed directly from a non-volatile memory module coupled to a device controller over an interface without the need to first retrieve initialization parameters or data from an external non-volatile memory chip. As shown, the process 500 may be executed after a power cycle.

At block 502, bootstrap option data may be read from bootstrap hardware by hardware of a controller of a computing device, such as a data storage device. At block 504, the process 500 involves loading initialization parameters from non-volatile registers of the controller into an interface state machine. The interface state machine may comprise hardware configured to execute initialization and/or training operations for initializing and/or training an interface for communication between the controller and a non-volatile memory module coupled to the controller over the interface. The bootstrap option data may direct the controller to perform said loading, which may comprise transferring hardware fuse values into the state machine. For example, one or more strap options may enable required system interfaces.

At block 506, the process 500 involves initializing the interface using the initialization parameters and the interface state machine. While certain systems and devices may implement interface initialization according to an algorithm run by the system processor(s), in certain embodiments, the interface initialization/training blocks 505 of the process 500 are performed while the system processor(s) are held in reset, and therefore unavailable for such purposes. Therefore, in certain embodiments, the steps 505 are implemented at least in part using hardware logic and/or data storage registers of the controller.

The state machine logic that implements at least part of the blocks 505 may be embedded in the hardware. This may require an augmentation to standard controller hardware design to accommodate such functionality. Therefore, the communication interface, together with the state machine, may be considered a self-training hardware state machine.

With further reference to FIG. 5, as mentioned above, the block 508 involves training the interface. In certain embodiments, at least a portion of the operations described with reference to block 504, 506, 508 may be performed without executing firmware by processors of the controller. That is, such operations may be performed strictly using hardware devices. The interface initialization parameters may be maintained in one or more non-volatile hardware registers of the controller and executed by the state machine.

Training of the interface may involve any suitable or desirable process. For example, training may involve placing certain hardware parameters into appropriate positions within the communication interface. In certain embodiments, the process 500 includes a multi-stage training process. When a first step of training is completed successfully, as may be indicated by a status update, the process may move on to a next step.

At block 510, the process 500 may involve releasing the one or more processors of the controller only after the interface has been initialized and/or trained. With the one or more processors active, the process 500 may involve executing firmware stored in non-volatile memory connected to the controller over the interface.

Therefore, according to the process 500 as implemented in a DDR-attached memory solution, state machine logic may provide capability to perform DDR interface training without the need for code execution. With the ability to store custom DDR training parameters in the controller hardware, and with hardware state machine logic to perform initialization/training, the first data fetched by the processor(s) after a power cycle may be from a memory device attached to the DDR interface. It may be unnecessary to copy code to a DDR-attached memory that is non-volatile and stores code persistently. This provides substantial benefit since such copying can take a substantial amount of time in certain systems due to the relatively slow interface commonly associated with external boot devices.

The inclusion of one-time programmable subset of hardware registers that is used to program the DDR interface may allow for a single non-volatile memory device connected to the external DDR interface of the controller. That is, no serial NOR boot flash may need to be present to assist in the boot process.

Additional Embodiments

Those skilled in the art will appreciate that in some embodiments, other types of firmware execution systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A device comprising:
   a controller comprising:
      a processor;
      a memory interface;
      an interface state machine; and
      one-time programmable non-volatile storage coupled to the interface state machine, the one-time programmable non-volatile storage storing initialization parameters for training the memory interface; and
   a non-volatile memory module separate from the one-time programmable non-volatile storage, the non-volatile memory module storing firmware for the device, the non-volatile memory module coupled to the controller via the memory interface;
   wherein the controller is configured to:
      while the processor is held in reset:
         initialize the memory interface using the initialization parameters and the interface state machine; and
         train the memory interface using the initialization parameters and the interface state machine;
      release the processor from reset; and
      execute the firmware from the non-volatile memory module using the processor and the trained memory interface.

2. The device of claim 1, wherein the memory interface requires training before the non-volatile memory module can be accessed.

3. The device of claim 1, wherein the memory interface is a double data rate (DDR) interface.

4. The device of claim 1, wherein the one-time programmable non-volatile storage comprises one or more hardware registers.

5. The device of claim 4, wherein the one or more hardware registers comprise one-time programmable hardware devices programmed during a manufacturing process.

6. The device of claim 1 further comprising one or more hardware devices configured to store bootstrap option data, wherein:
   the controller is further configured to read the bootstrap option data prior to said initializing the memory interface and while the processor is held in reset; and
   said initializing the memory interface is directed at least in part by the bootstrap option data.

7. The device of claim 1, wherein the device does not include a separate boot loader ROM chip storing the firmware.

8. The device of claim 1, wherein the device does not include a non-volatile memory chip storing the initialization parameters separate from the one-time programmable non-volatile storage.

9. The device of claim 1, wherein the controller is further configured to boot the device without copying boot code to the non-volatile memory module.

10. The device of claim 1, wherein the device is a data storage device.

11. The device of claim 1, wherein the controller is further configured to perform said initializing and said training without using firmware code.

12. A method of executing firmware in a computing device, the method comprising:
while a processor of a computing device is held in reset:
accessing initialization parameters stored in one-time programmable non-volatile storage of the computing device, the initialization parameters configured for training a memory interface of the computing device;
providing the initialization parameters to an interface state machine coupled to the one-time programmable non-volatile storage via the memory interface;
initializing the memory interface using the initialization parameters and the interface state machine; and
training the memory interface using the initialization parameters and the interface state machine;
releasing the processor from reset; and
executing firmware stored in a non-volatile memory module using the processor and the trained memory interface.

13. The method of claim 12, wherein the memory interface is a double data rate (DDR) interface.

14. The method of claim 12, wherein the one-time programmable non-volatile storage comprises one or more hardware registers.

15. The method of claim 14, wherein the one or more hardware registers comprise one or more fuses burned during a manufacturing process.

16. The method of claim 12 further comprising reading bootstrap option data from one or more hardware devices prior to said accessing.

17. The method of claim 12, further comprising booting the computing device without copying boot code to the non-volatile memory module after initializing the memory interface.

18. The method of claim 12, wherein the computing device is a data storage device.

19. The method of claim 12, wherein said initializing and said training are performed without using firmware code.

20. A computing device comprising:
a controller comprising:
one or more processors;
a memory interface; and
one-time programmable non-volatile storage storing initialization parameters;
a non-volatile memory module separate from the one-time programmable non-volatile storage, the non-volatile memory module storing firmware for the device, the non-volatile memory module coupled to the controller via the memory interface; and
means for accessing the initialization parameters and initializing the memory interface using the initialization parameters while the one or more processors are held in reset;
wherein the controller is configured to execute the firmware from the non-volatile memory module using the one or more processors after the memory interface has been initialized.

21. The computing device of claim 20, wherein the means for accessing the initialization parameters and initializing the memory interface comprises an interface state machine.

22. The computing device of claim 20, wherein the memory interface is a double data rate (DDR) interface.

23. The computing device of claim 20, wherein the controller is further configured to release the one or more processors after the memory interface has been initialized.

24. The computing device of claim 20, wherein the one-time programmable non-volatile storage comprises one or more hardware registers.

25. The computing device of claim 24, wherein the one or more hardware registers comprise one-time programmable hardware devices programmed during a manufacturing process.

* * * * *